United States Patent [19]
Fertl

[11] Patent Number: 4,494,071
[45] Date of Patent: Jan. 15, 1985

[54] DETERMINATION OF WATER SATURATION IN EARTH FORMATIONS INDEPENDENT OF LITHOLOGY

[75] Inventor: Walter H. Fertl, Houston, Tex.

[73] Assignee: Dresser Industries, Inc., Dallas, Tex.

[21] Appl. No.: 340,911

[22] Filed: Jan. 20, 1982

[51] Int. Cl.$^3$ .................... G01V 3/12; G01V 3/30; E21G 49/00
[52] U.S. Cl. .................... 324/338; 166/252
[58] Field of Search .............. 324/338, 340, 341, 366, 324/369; 166/252, 273, 274

[56] References Cited

U.S. PATENT DOCUMENTS

| Re. 28,963 | 9/1976 | Fertl et al. | 166/252 |
| 3,878,890 | 4/1975 | Fertl | 166/252 |
| 3,944,910 | 3/1976 | Rau | 324/6 |

OTHER PUBLICATIONS

SPE Paper 9041—Advancements in Electromagnetic Propagation Logging by R. P. Wharton, Gary A. Hazen, Rama N. Rau and David L. Best, Schlumberger Well Services, May 14–16, 1980; pp. 1–5.

SPE Paper 6542—Electromagnetic Propagation . . . A New Dimension in Logging by T. J. Calvert, R. N. Rau and Larry E. Wells, Schlumberger Well Services, Apr. 13–15, 1977; pp. 3, 7–9.

Dielectric Logging by D. Oliver—Dresser Atlas, Dresser Industries, Inc., pp. 2–5.

Primary Examiner—Gerard R. Strecker
Assistant Examiner—Walter E. Snow
Attorney, Agent, or Firm—Patrick H. McCollum; Richard M. Byron

[57] ABSTRACT

A method for determining the water saturation of subsurface earth formations substantially independent of lithology utilizing electromagnetic energy propagation measurements. The subsurface formations are first logged to obtain base log measurements of the dielectric permittivity of the formations as derived from electromagnetic energy propagation time values. The formations are then injected with a sufficient amount of oil miscible solution containing a surface active agent to displace substantially all the residual fluids from the formations for a radial distance at least equal to the radial zone of investigation. The formations are then injected with a sufficient amount of water to render the zone of investigation substantially 100 percent water saturated. The formations are logged a second time to obtain measurements of the dielectric permittivity of the saturated formations. Combining the base log measurements with the subsequent log measurements to provide a log of the water saturation of the formations substantially independent of lithology.

1 Claim, 1 Drawing Figure

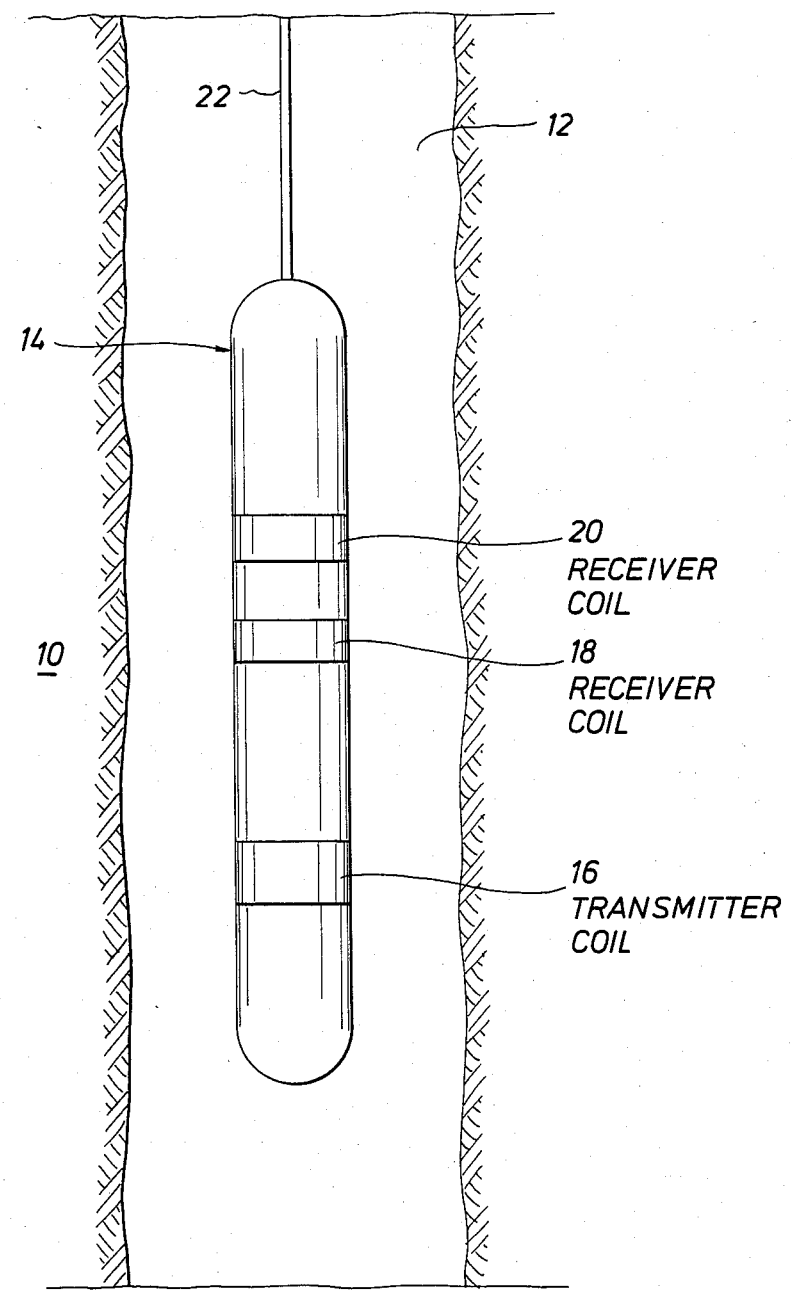

DETERMINATION OF WATER SATURATION IN EARTH FORMATIONS INDEPENDENT OF LITHOLOGY

BACKGROUND OF THE INVENTION

The present invention relates to a method of logging earth formations traversed by a borehole and, more particularly, to an improved method for the determination of water saturation in subsurface earth formations substantially independent of lithology utilizing electromagnetic energy propagation measurements.

The search for oil and gas has resulted in a need for a method of distinguishing directly hydrocarbons from water in subsurface earth formations. One technique suggested to make such determination relies upon the dielectric permittivity or dielectric constant of materials. Dielectric constant is a basic electrical property of matter for which hydrocarbons and water have distinctly different characteristics. Basically, the dielectric constant of any material is proportional to the electric dipole moment per unit volume. With the exception of water, there are very few materials abundantly found in nature which have permanent electric dipoles.

The primary measurements for determining dielectric constant of material are electromagnetic energy propagation time and attenuation rate. The electromagnetic energy propagation time of water differs considerable from that of oil. Such a measurement provides a determination of water saturation in subsurface earth formations which is substantially independent of water salinity. Experimentation has found that the loss-free electromagnetic energy propagation time for oil to be approximately 4.9 nanoseconds per meter which relates to a relative dielectric permittivity of 2.2. Likewise, the loss-free electromagnetic energy propagation time for water has been found to be from between 25–30 nanoseconds per meter relating to a relative dielectric permittivity from between 56–80. Thus, a measurement of the dielectric permittivity of the earth materials provide a method of directly estimating formation water saturation substantially independent of water salinity variations.

One difficulty encountered in estimating water saturation in the vicinity of a borehole from electromagnetic energy propagation time measurement is the so called "matrix effect". Matrix effect described is a major unknown which is the value of the electromagnetic energy propagation time value of the complex lithologies. For such complex lithologies it is common to determine the electromagnetic propagation time value empirically from the matrix grain density and an estimate of the lithologic components as derived from additional logging measurements. These additional logging measurements require the expenditure of time and money. Additionally, empirical estimates have been found to be inaccurate in the presence of gas or other light hydrocarbons in the formations.

These and other disadvantages are overcome with the present invention by providing a method for determining the water saturation in earth formations surrounding a borehole substantially independent of complex lithologies.

SUMMARY OF THE INVENTION

The present invention provides a method for determining water saturation in subsurface earth formations substantially independent of lithology utilizing electromagnetic energy propagation measurements. A well logging instrument is caused to traverse a borehole injecting electromagnetic energy into the formations and measurements are taken which relate to the propagation of such energy in the formations. Electromagnetic energy is emitted from a transmitter in the form of a lateral wave which travels in the formation adjacent the borehole. The transmitted energy is received at a pair of longitudinally spaced receiver locations and processed to yield the electromagnetic energy propagation time for the formation area between the receiver locations. The results provide an electromagnetic energy propagation time base log where water saturation is less than unity ($Sw < 1.0$).

The formations are then injected with a sufficient amount of aqueous solution containing a surface active agent to displace all of the oil miscible solution. The chemically cleaned formations are resaturated with a brine solution restoring the formations to 100% water saturated ($Sw = 1.0$). The water saturated formations are then logged to obtain an electromagnetic energy propagation log. Combining the electromagnetic energy propagation time base log with the subsequent electromagnetic energy propagation time log for 100% water saturated formations provides a determination of water saturation in the reservoir immediately around the wellbore independent of the lithology and hence independent of the matrix electromagnetic energy propagation time value.

BRIEF DESCRIPTION OF THE DRAWING

The FIGURE is a side elevation, partly in cross-section of a borehole logging instrument in operative position according to the present invention.

DETAILED DESCRIPTION OF THE PREFERRED EMBODIMENT

Referring now to the Drawing in more detail, there is illustrated schematically a well surveying operation in which a portion of the subsurface earth formations 10 is shown in vertical section. A portion of a borehole 12 is shown penetrating the formations 10. Disposed within the borehole 12 is subsurface logging instrument 14 of the well logging system. Subsurface instrument 14 comprises a transmitter 16 and two receivers 18 and 20 longitudinally spaced therefrom. Cable 22 suspends the instrument 14 in the well 12 and contains the required conductors for electrically connecting the instrument 14 with the surface apparatus (not shown). The cable 22 is wound on or unwound from a drum located at the earth's surface in raising and lowering instrument 14 to traverse the well 12.

In the preferred embodiment transmitter 16 comprises an electrical coil circumferentically arranged on instrument 14 and two receiver coils 18 and 20 longitudinally spaced approximately 0.8 meters and 1.0 meters, respectively, from transmitter 16. Transmitter 16 emits an electromagnetic energy signal in the frequency range from between 10 mHz and 200 mHz, most preferably 47 mHz, the amplitude and phase of which is measured at each receiver 18 and 20. From this information, the ratio of amplitudes and the phase difference between the two receivers are derived and processed for an electromagnetic energy propagation time measurement for the formation zone located between the two receiver locations. The electromagnetic energy propagation time measurements are used to differentiate between hydrocarbons and water contained in the surveyed formations.

A typical approach to determine water saturation based on electromagnetic energy propagation time measurements is represented by the equation:

$$t_{EP1} = \phi S_w t_{EPW} + \phi(1-S_w) t_{EPHC} + (1-\phi) t_{EPM} \quad (1)$$

where $t_{EP1}$ = log-derived electromagnetic energy propagation time (nsec/m);

$\phi$ is reservoir porosity;

$\phi S_w T_{EPW}$ is waterfilled porosity, with $t_{EPW}$ being the electromagnetic propagation time for water at reservoir conditions (nsec/m);

$\phi(1-S_w) t_{EPHC}$ is hydrocarbon filled porosity, with $t_{EPHC}$ being the electromagnetic energy propagation time for hydrocarbons (nsec/m); and $(1-\phi) t_{EPM}$ is the rock matrix, with $t_{EPM}$ being the electromagnetic energy propagation time for the rock matrix (nsec/m).

Therefore, $$S_w = \frac{\phi(t_{EPM} - t_{EPHC}) + (t_{EP1} - t_{EPM})}{\phi(t_{EPW} - t_{EPHC})} \quad (2)$$

As previously stated, one major unknown in electromagnetic energy propagation measurement is the value of $t_{EPM}$, the electromagnetic energy propagation time for the rock matrix. This condition is especially true where complex lithologies are being surveyed. Commonly, $t_{EPM}$ is determined empirically from the matrix grain density and an estimate of lithologic components as derived from additional well logging measurements, more specifically from both density and neutron type logging measurements.

The method of the present invention avoids the need for the empirical determination of electromagnetic energy propagation time for the rock matrix and provides a more accurate measurement of water saturation for complex lithologies. Once the base logging measurements are obtained the formation is treated by injecting an aqueous solution containing a surface active agent to displace substantially all of the residual fluids in the area of the formation surrounding the borehole. The amount of solution employed in the reservoir flooding can vary widely but is in an amount sufficient to remove substantially all of the residual fluids from the formations at least equal to the depth of investigation of the logging instrument. Any suitable flooding technique can be employed, for example, utilizing an aqueous solution containing a surface active agent from the general classes of ampholytic, anionic, cationic and nonionic. An ampholytic class surface active agent is one that is cationic in acidic solutions and anionic in basic solutions, such as cetylamenoacetic acid. An aniomic class surface active agent is one having a negatively charged surface-active ion, such as generally, alkyl aromatic sulfonates, fatty alcohol sulfates and "blocked" carboxyl. Cationic class surface active agent are quaternary ammonium salts in which one of the hydrocarbon chains is of the same order of length as those of the fatty acids, and a nonionic class surface reactive agent is derived from condensation products of long-chain glycols and octyl or nonyl phenols and do not ionize.

After the chemical flooding operation has displaced substantially all of the residual fluids from the radial zone of interest a sufficient amount of water is injected through the borehole into the chemically cleaned formations to displace substantially all of the flooding solution, thus rendering the formations substantially one hundred percent (100%) water saturated. The water used to re-saturate the formations can be either original formation water or brine water. A second electromagnetic energy propagation logging operation is performed to derive the electromagnetic energy propagation time measurements for the formations at 100 percent water saturation. The second electromagnetic propagation time measurements are represented by the equation:

$$t_{EP2} = \phi t_{EPW} + (1-\phi) t_{EPM} \quad (3)$$

where $S_w = 1.0$.

Combining the electromagnetic energy propagation time measurements of the base log with those of the subsequent log provides a water saturation measure substantially independent of lithology as illustrated by the relation:

$$\Delta t_{EP1,2} = t_{EP1} - t_{EP2} = \phi(S_w t_{EPW} + t_{EPHC} - S_w t_{EPHC} - t_{EPW}) \quad (4)$$

$$S_w = 1 + \frac{\Delta t_{EP1,2}}{\phi(t_{EPW} - t_{EPHC})} = 1 - \frac{\Delta t_{EP1,2}}{\phi(t_{EPHC} - t_{EPW})} = \quad (5)$$

$$1 + \frac{\Delta t_{EP2,1}}{\phi(t_{EPHC} - t_{EPW})} = 1 - \frac{\Delta t_{EP2,1}}{\phi(t_{EPW} - t_{EPHC})}$$

where $t_{EP1}$, when $S_w < 1.0$, $< t_{EP2}$, when $S_w = 1.0$.

Thus, there has been described and illustrated herein a method in accordance with the present invention for determining water saturation for subsurface earth formations substantially independent of lithology utilizing electromagnetic energy propagation measurements. However, those skilled in the art will recognize that obvious modifications can be made to the preferred embodiments without departing from the spirit of the invention. For example, other suitable techniques can be employed to displace the residual fluid in the formation. Such other methods include alcohol displacement, and overbased surfactant water flooding.

The embodiments of the invention in which an exclusive property or privilege is claimed are defined as follows:

1. A method for determining the water saturation of subsurface earth formation of complex lithology substantially independent of salinity contrasts, comprising the steps of:

traversing a borehole with a logging instrument having a transmitter injecting electromagnetic energy in the frequency range from 10 mHz to 200 mHz into the formations and first and second longitudinally spaced receivers for detecting the amplitude and phase of said electromagnetic energy;

generating a first electrical measurement functionally related to the propagation time of said electromagnetic energy through said formations;

injecting into said formations an aqueous solution containing a surface active agent to displace substantially all the residual fluids in said formations surrounding said borehole, wherein said surface active agent is selected from the group consisting of ampolytie, cationic and nonionic;

injecting into said formations water to displace said aqueous solution in a sufficient amount and to render said formations surrounding said borehole substantially water saturated;

traversing said borehole with said logging instrument and generating a second electrical measurement functionally related to the propagation time of said electromagnetic energy through said water saturated formations;

said first measurement determined in accordance with the relationship $$t_{EP1} = \phi S_w t_{EPW} + \phi(1-S_w)t_{EPHC} + (1-\phi)t_{EPM}$$

and said second measurement determined in accordance with the relationship $$t_{EP2} = \phi t_{EPW} + (1-\phi)t_{EPM};$$

were $t_{EP1}$ and $t_{EP2}$ are log-derived electromagnetic energy propagation time, $\phi$ is reservoir porisity, $\phi S_w t_{EPW}$ is water filled porosity, $\phi(1-S_w)t_{EPHC}$ is hydrocarbon filled porosity and $(1-\phi)t_{EPM}$ is the rock matrix; and combining said first and said second electrical measurements to determine the water saturation of said formations substantially independent of salinity contrasts.

* * * * *